Aug. 23, 1938.  R. HINTZE  2,128,090
REFRIGERATING APPARATUS OF THE COMPRESSION TYPE
Filed Dec. 16, 1937
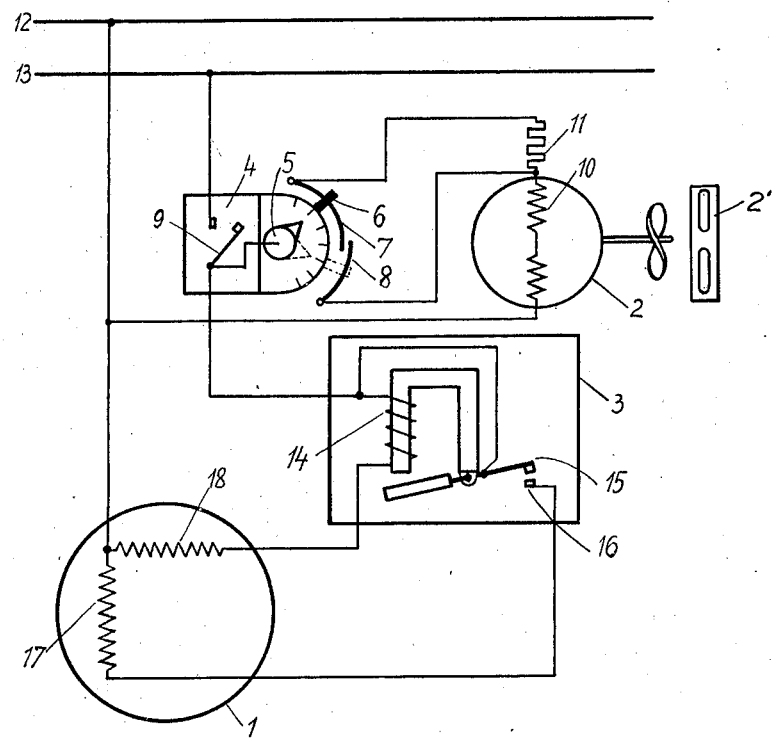
Inventor
Rudolf Hintze
by Knight Bro.
attorneys Patented Aug. 23, 1938

2,128,090

UNITED STATES PATENT OFFICE 2,128,090

REFRIGERATING APPARATUS OF THE COMPRESSION TYPE

Rudolf Hintze, Berlin-Charlottenburg, Germany, assignor to Siemens-Schuckertwerke Aktiengesellschaft, Berlin-Siemensstadt, Germany, a corporation of Germany Application December 16, 1937, Serial No. 180,196
In Germany December 28, 1936

4 Claims. (Cl. 62—4)

The present invention relates to improvements in refrigerating apparatus of the compression type.

In refrigerating apparatus of the compression type an adjustable thermostat operating in accordance with the temperature prevailing in the cooling chamber is, as a rule, employed and puts the driving motor of the compressor into and out of operation depending upon whether the adjusted temperature exceeds or falls below a predetermined value. The thermostat is in most cases so designed as to be adjusted by hand so that the refrigerating capacity may be regulated at will depending upon the external operating conditions (season, products contained in the cabinet). In refrigerating apparatus of the compression type a blower is often employed for increasing the dissipation of heat and for supplying the condenser of the refrigerating apparatus and in some constructions also the compressor with cooling air.

According to the present invention the speed of the blower is controlled by the adjustment of the thermostat. In this manner it is possible with the thermostat being so adjusted as to correspond to an increase of the refrigerating capacity to also cause the blower to run more rapidly, thereby attaining a very effective cooling of the heat radiating parts during this operating period. In the normal operating periods the blower is caused to run at a low speed. This has the advantage that the noise caused by the blower motor is considerably attenuated. Furthermore, the current consumption of the blower motor is reduced during this period. The arrangement according to the invention is preferably such that the blower motor may be changed over in various, preferably in two speed steps.

In the accompanying drawing is shown the wiring diagram of an embodiment of the invention.

1 denotes the driving motor for the compressor, 2 a blower motor, 2' the condenser of the refrigerator to be cooled by the blower, 3 a change-over relay, 4 the adjustable thermostat operating in accordance with the cooling chamber temperature. The thermostat is provided with a rotary control switch 5 adjustable by hand, by means of which the operating temperature of the thermostat is so regulated that a decrease of the temperature in the cabinet is attained upon rotating the switch 5 in the clockwise direction. Rigidly secured to the control switch 5 is a switch 6 cooperating with sliding contacts 7 and 8. If the switch 5 is in the position shown in which the switch 6 contacts with the sliding contact 7, the thermostat 4 is, for instance, so adjusted that it closes its contact lever 9 upon exceeding a cooling chamber emperature of 9° and opens the lever if the temperature of the cooling chamber decreases below 7°. If the switch 5 is rotated in the clockwise direction into the position shown in dotted lines, the adjustment of the thermostat is, for instance, so varied that the thermostat closes its contact lever 9 if the cooling chamber temperature increases above 5° and opens the lever if the cooling chamber temperature decreases below 3°. Depending upon the adjustment of the thermostat the compressor of the refrigerating apparatus when switched in runs until it has attained the lowest adjusted limit value. If in the upper position of switch 5 in which switch 6 contacts with sliding contact 7, the thermostat closes the contact lever 9, the winding 10 of the blower motor 2 is connected in with a series resistance 11 to the supply circuit 12, 13 so that the blower motor runs at low speed. Upon the closure of the contact 9 the winding 14 of the relay 3 is at the same time energized so that the latter closes its contacts 15, 16, thus connecting the auxiliary phase 17 of the driving motor of the compressor to the supply circuit. In this case the winding 14 is in series with the main phase 18 of the compressor motor. After the motor is started, the current flowing through the winding 14 and the main phase 18 decreases so that the relay 3 is released and opens the contacts 15, 16, thus disconnecting the auxiliary phase 17. If the control switch 5 of the thermostat 4 is rotated in the clockwise direction, for instance, into the position shown in dotted lines the switch 6 contacts with the brush 8. In this case the series resistance 11 is cut out and the winding 10 of the blower motor is directly connected to the supply circuit 12, 13 upon the closure of the thermostat 9. In the above adjusted position which corresponds to a greater decrease of the temperature prevailing in the cooling chamber the blower runs at a high speed. The heat dissipation of the heat radiating parts of the refrigerating apparatus is, consequently, improved during the period of increased cooling.

What is claimed is:

1. An arrangement for regulating the temperature in refrigerating apparatus of the compression type, comprising a driving motor for the compressor, a blower for cooling the condenser, a thermostat for controlling said driving motor in dependence upon said temperature, a drive of adjustable speed for said blower, means for adjusting the operating temperature of said thermostat, and an operative connection between said means and said drive so as to adjust the speed of said blower in accordance with the adjustment of said thermostat.

2. An arrangement for regulating the temperature in refrigerating apparatus of the compression type, comprising a driving motor for the compressor, a blower for cooling the condenser, a speed regulator operatively connected with said blower, a thermostat for controlling said motor in dependence upon the temperature to be regulated, a device adjustable by hand for setting the operating temperature limits of the thermostat, said device being connected with said speed regulator so as to simultaneously adjust the speed of said blower.

3. An arrangement for regulating the temperature in refrigerating apparatus of the compression type, comprising a driving motor for the compressor, a blower for cooling the condenser, a speed regulator operatively connected with said blower, a thermostat for controlling said motor in dependence upon the temperature to be regulated, a device for adjusting the operating temperature limits of said thermostat, said adjusting device being connected with said speed regulator, said speed regulator being so arranged that the speed of said blower is increased if the thermostat is adjusted to low operating temperature limits and decreased at high temperature limits.

4. An arrangement for regulating the temperature in refrigerating apparatus of the compression type, comprising a driving motor for the compressor, a blower for cooling the condenser, a speed regulator operatively connected with said blower, a thermostat for controlling said motor in dependence upon the temperature to be regulated, a device for adjusting the operating temperature limits of said thermostat, said adjusting device being connected with said speed regulator, said speed regulator being provided with two speed steps and so arranged that the high blower speed is effective if said thermostat is adjusted to low operating temperatures.

RUDOLF HINTZE.